(12) United States Patent
Provost

(10) Patent No.: US 6,335,799 B1
(45) Date of Patent: Jan. 1, 2002

(54) PLASTIC CARD PERSONALIZER SYSTEM

(75) Inventor: Dan Provost, Dallas, TX (US)

(73) Assignee: eFunds Corporation, Milwaukee, WI (US)

( * ) Notice: Subject to any disclaimer, the term of this patent is extended or adjusted under 35 U.S.C. 154(b) by 0 days.

(21) Appl. No.: 08/006,585

(22) Filed: Jan. 21, 1993

(51) Int. Cl.[7] .................................................. G06K 15/00
(52) U.S. Cl. .............................................. 358/1.4; 358/1.3
(58) Field of Search .................................. 345/103, 104; 235/380, 488; 156/270

(56) References Cited

U.S. PATENT DOCUMENTS

| | | | | | |
|---|---|---|---|---|---|
| 3,897,964 | A | * | 8/1975 | Oka et al. .......................... | 283/7 |
| 4,026,642 | A | * | 5/1977 | Tanaka et al. ..................... | 355/1 |
| 4,269,473 | A | * | 5/1981 | Flothmann et al. ............... | 359/2 |
| 4,318,554 | A | * | 3/1982 | Anderson et al. ............... | 283/76 |
| 4,398,202 | A | * | 8/1983 | Henderson ....................... | 346/29 |
| 4,544,184 | A | * | 10/1985 | Fround et al. ................... | 283/94 |
| 4,573,711 | A | * | 3/1986 | Hyde ............................... | 283/98 |
| 4,589,687 | A | * | 5/1986 | Hannon ........................... | 283/94 |
| 4,626,669 | A | * | 12/1986 | Davis et al. ................... | 235/380 |
| 4,711,996 | A | * | 12/1987 | Drexler .......................... | 235/468 |
| 4,735,670 | A | * | 4/1988 | Maurer et al. ............. | 156/272.8 |
| 4,835,376 | A | * | 5/1989 | Drexler .......................... | 235/488 |
| 4,938,830 | A | * | 7/1990 | Cannistra ....................... | 156/270 |
| 4,999,065 | A | * | 3/1991 | Wilfert ............................. | 156/64 |
| 5,034,081 | A | * | 7/1991 | Aizawa et al. ................ | 156/220 |
| 5,058,039 | A | * | 10/1991 | Warnoff et al. .............. | 345/104 |
| 5,173,080 | A | * | 12/1992 | Longtin ............................. | 462/2 |
| 5,241,165 | A | * | 8/1993 | Drexler .......................... | 235/488 |
| 5,283,423 | A | * | 2/1994 | Venambre et al. ........... | 235/492 |
| 5,318,941 | A | * | 6/1994 | Ohshima et al. ............. | 503/227 |
| 5,355,411 | A | * | 10/1994 | MacDonald ..................... | 380/23 |

FOREIGN PATENT DOCUMENTS

| | | | | | |
|---|---|---|---|---|---|
| EP | 440814 A1 | * | 3/1991 | ............. | G06F/15/21 |
| JP | 58196545 | * | 2/1984 | ............... | G03F/1/04 |
| JP | 0125141 | * | 5/1989 | ............. | B43L/13/00 |
| JP | 2179799 | * | 9/1990 | ............. | B43L/13/00 |
| JP | 329701 | * | 4/1991 | ............... | B65B/3/00 |
| JP | 4152197 | * | 9/1992 | ............. | B43L/13/00 |
| JP | 4348996 | * | 4/1993 | ............. | B43L/13/00 |
| JP | 5318985 | * | 3/1994 | ............. | B43L/13/00 |
| JP | 6234219 | * | 11/1994 | ............... | B41J/2/06 |

OTHER PUBLICATIONS

Identograph K142—Electronic Card Engraving with Highest Precision. Intrapoc Indust.Gmbh Date Unknown. Advertising brochure.

Magtek Readers & Encoders. Mag–tek Inc., Carson CA 90746. Date Unknown (copyright 1992). Advertising brochure.

PRIMA Plastic Card Embossing Systems. FIMA USA, Inc., Marlboro, MA 01752. Date Unknown. Advertising brochure.

* cited by examiner

Primary Examiner—Gabriel I. Garcia
(74) Attorney, Agent, or Firm—Dorsey & Whitney LLP

(57) ABSTRACT

A novel apparatus and method for the immediate issuance of personalized identification cards during client interviews. The invention relates to the creation of personalized cards and recording of personal information on a realtime basis while a client is being interviewed by a card issuing authority. More particularly, the invention electronically records and permanently prints client personal information on cards using a computer and printing system in a single client contact. The invention immediately issues only a single permanent card, eliminating the need and expense of a delay in issuing a permanent card or in issuing two cards; a first temporary card and a second permanent card. The invention also eliminates the need for more expensive personalizing equipment.

29 Claims, 13 Drawing Sheets

PLASTIC CARD PERSONALIZER SYSTEM

TECHNICAL FIELD

This invention pertains to an apparatus and process for the economical issuance of secure personalized plastic cards. More particularly, this invention pertains to the immediate issuance of personalized wallet-size plastic cards printed at remote sites in conjunction with a large central computer record keeping system.

BACKGROUND OF THE INVENTION

In today's high tech society, it has become commonplace and necessary for organizations to issue individual identification cards to participants or members. These cards, usually made of plastic, are widely issued by financial institutions, government organizations, and organizations having membership requirements. A typical person in the United States has approximately 6–12 plastic cards in his possession at any given time. Many government organizations with tight budgets are investing millions of dollars to issue personalized cards to their constituents.

The cards themselves are usually made of polyvinyl chloride (PVC) but are sometimes made from polyester. Many of the cards are fancifully designed and colored with pictures and logos. Most of these cards are personalized for the customer in some manner at great cost.

Any method for personalizing cards is generally more expensive than methods providing less personal information on the card. Methods for personalizing cards at a central location incur the additional cost of delivering the card to the client or customer. Many times this delivery to each individual client or customer is by first class mail. However, known methods for personalizing cards locally are generally the most expensive methods for personalizing.

For example, government organizations involved in welfare distribution to welfare recipients usually personalize cards at a high cost. The government organizations first issue temporary cards to welfare recipients during the first office visit. Later the recipients receive permanent personal cards by First Class mail. These cards are printed at a central location.

A system which personalizes cards at an organization's central location in high volume is available from either the Datacard or Oakwood company. These systems require a significant capital investment—exceeding $100,000. Central processing systems add cost to the issuing organization such as, labor costs, capital outlay for the high-end equipment, card costs of approximately 40¢ per card, postage, envelopes, and card carriers for envelopes. If an issuing authority centrally personalizing cards issues four to five thousand cards per day, the issuing authority's costs, are approximately 75¢ per card. If the issuing authority is centrally personalizing cards and issuing only fifty to one hundred cards per day, the cost per card rises to approximately $1.00 per card or more. Perhaps more importantly, the added cost of issuing two cards for each client is enormous. The consumer is initially issued a temporary card and must wait for the arrival of the second card, the permanent personalized card.

There are essentially four levels of personal information placed on personalized cards available on the market. The four levels of personalization will be described from those providing the least personal information on the card to those providing the most personal information on the card. The first level of personalization is achieved through the use of the standard vault card or instant issue card. There is no personal information on level one cards. The only personalization achieved with level one is that the card number (or account number) is related in a computer program to a particular person and the person's Personal Identification Number (PIN). Vault cards are industry standard cards that are kept locked by the issuing authority in a vault. The cards are generally pre-embossed either with raised lettering or flat graphics, and pre-encoded on a magnetic strip. The pre-embossing and pre-encoding is generally completed to the International Standards Organization (ISO) specifications. The vault cards or instant issue cards may be issued with or without magnetic strip coded with the card number.

The next level of personalization, second level, is achieved by issuing a vault card (or instant issue card) and personalizing the card with handwritten material. Level two personalized vault cards are generally not issued with magnetic strips. In fact, some of these cards are blank cards without any embossing. The cards are locally personalized by employees of the card issuing authority. The personalizing is done by handwriting on small areas of the card which have a paper or other writing surface. Level two provides low cost, low security cards.

The next level of personalization, or third level, is achieved by embossing personal information on the card either through raised lettering or flat lettering. This embossing may be done at a central location with a high volume embossing machine or at a local location with a smaller low volume embossing machine.

The first level of personalization, fourth level, provides the greatest amount of personal information on the card by combining the magnetic encoding of personal information on the card in addition to the embossing of personal information on the card.

The cost to personalize cards is high. For example, the cost of a manual embosser (or hand press) which provides raised lettering and no encoding is approximately $2,000. An automated embosser with keyboard entry performing only raised lettering costs approximately $5,000 to $7,000. An automated embosser and magnetic encoder combination costs approximately $10,000 to $12,000. An embosser and encoder combination that is fully integrated with a personal computer costs approximately $15,000 to $17,000 (excluding software development). The cost of a flat graphic embosser which includes the ability to digitize pictures is approximately $35,000 per unit. Once such embosser is manufactured by Datacard Corporation and is called the Ultragrafix™ U-800. The other personalizing devices described are available from several vendors including Datacard, Magtek and Oakwood corporations.

Consumers prefer to have their names on all plastic cards that they hold. Having their name on the card avoids confusion within a household if members of the household accidently exchange cards. In addition, if a card with an owner's name on it is lost, the owner can be more easily located and the card returned.

The magnetic strip on the back of most plastic cards can hold only a limited amount of information. The magnetic tracks meeting the ISO standard consist of three tracks that can hold approximately 40 characters per track. Most magnetic card readers available on the market read one or two tracks, generally the first and second track or the second and third track. This limited amount of character space on the magnetic strip restricts a card issuing authority's ability to place individual client information on the plastic card.

Placing personal information on cards will help satisfy clients. Many cards on the market today have a small signature panel where the client may sign his name to help eliminate fraudulent use of his card. Since many issued cards lack identifying information that is personalized to the client, swapping of cards and security on cards is difficult. Fraudulent use of cards is a costly societal problem. The addition of personal information on cards will help reduce fraudulent use of cards.

What is needed is an economical system for personalizing cards.

What is needed is a system that produces cards while the client is being interviewed by the card issuing authority.

What is needed is a system that can personalize cards at local sites.

What is needed is a system that quickly personalizes cards while the consumer waits.

What is needed is a new method of placing information on cards.

What is needed is a system that can place a great deal of personal information on a card prior to issuance.

What is needed is a system that limits the fraudulent use of cards.

What is needed is a system that will place information on industry standard financial transaction cards (ISO standard PVC cards).

SUMMARY OF THE INVENTION

Only a limited amount of information can be embossed on cards using raised lettering. Raised letter embossing requires a great deal of space on a card. Further, raised lettering embossing weakens a plastic card. Therefore, only a limited amount of information can be embossed before the integrity of the card 108 becomes unacceptable.

This invention is an economical secure system for the personalizing of plastic cards. Specifically, the present invention is a system that allows for the personalizing of plastic cards at remote sites while maintaining a data base that corresponds client personal information with unique card numbers. This is a particularly useful invention for card issuing organizations which maintain a central data base of client information that corresponds each client with unique card number. More specifically, card issuing organizations which have multiple remote sites which interview clients will achieve the greatest economic benefit from this invention. The card personalizer eliminates the need for issuing two cards, a temporary card and a permanent card. With the card personalizer, a permanent card may be personalized and issued during a client interview. The immediate issuing of a permanent personalized card creates a large cost savings to issuing organizations.

The card personalizer system consists of three essential components: a computer for data entry and driving a printing system, a printing system, and a modified plastic card. The computer allows entry of unique card identification numbers and client personal information. This information is then correlated and stored. The second function performed by the computer is the driving of a printing system that is capable of printing on portions of plastic cards which have been specially prepared for printing. Industry standard plastic cards that have been modified by the addition of a prepared writing surface are used in the preferred embodiment.

In its simplest embodiment the invention requires a personal computer, a plotter and an industry standard card (ISO) with a unique card identification number. To use the invention an operator simply inputs a unique card identification number, several fields of client personal information and prompts the computer to print the client personal information a prepared writing surface on the plastic card.

The system is easy to use and is very economical. A simple personal computer and plotter are located at numerous remote sites and each is connected to a central data processor that stores client records.

A novel combination of computer, printing system and card provides economical permanent personalizing of cards. The printing system combines ink, ink delivery system and a prepared card writing surface to efficiently produce personalized cards.

The invention increases the security available to limit the fraudulent use of plastic cards. This is accomplished through greater use of client personal information, security text, and tamper proof text. The invention allows organizations to quickly and efficiently personalize cards at remote sites during a client interview. The invention allows the organization to maintain a central records while issuing cards from remote sites.

It is an object of this invention to provide an economical system for the personalizing of cards.

It is an object of this invention to provide an economical system where cards may be personalized at numerous local sites.

It is an object of this invention to issue personalized cards remotely while maintaining a central record system.

It is an object of this invention to have a simple system for personalizing cards.

It is an object of this invention to issue personalized cards to clients during an initial interview.

It is an object of this invention to personalize a client's card while the client waits for the card.

It is an object of this invention to increase security measures available for cards.

These and other objects and advantages of the invention will become obvious to those skilled in the art upon review of the description of a preferred embodiment and the appended drawings and claims.

The present invention is designed to address these needs.

DETAILED DESCRIPTION OF THE PREFERRED EMBODIMENT

Figure 1:
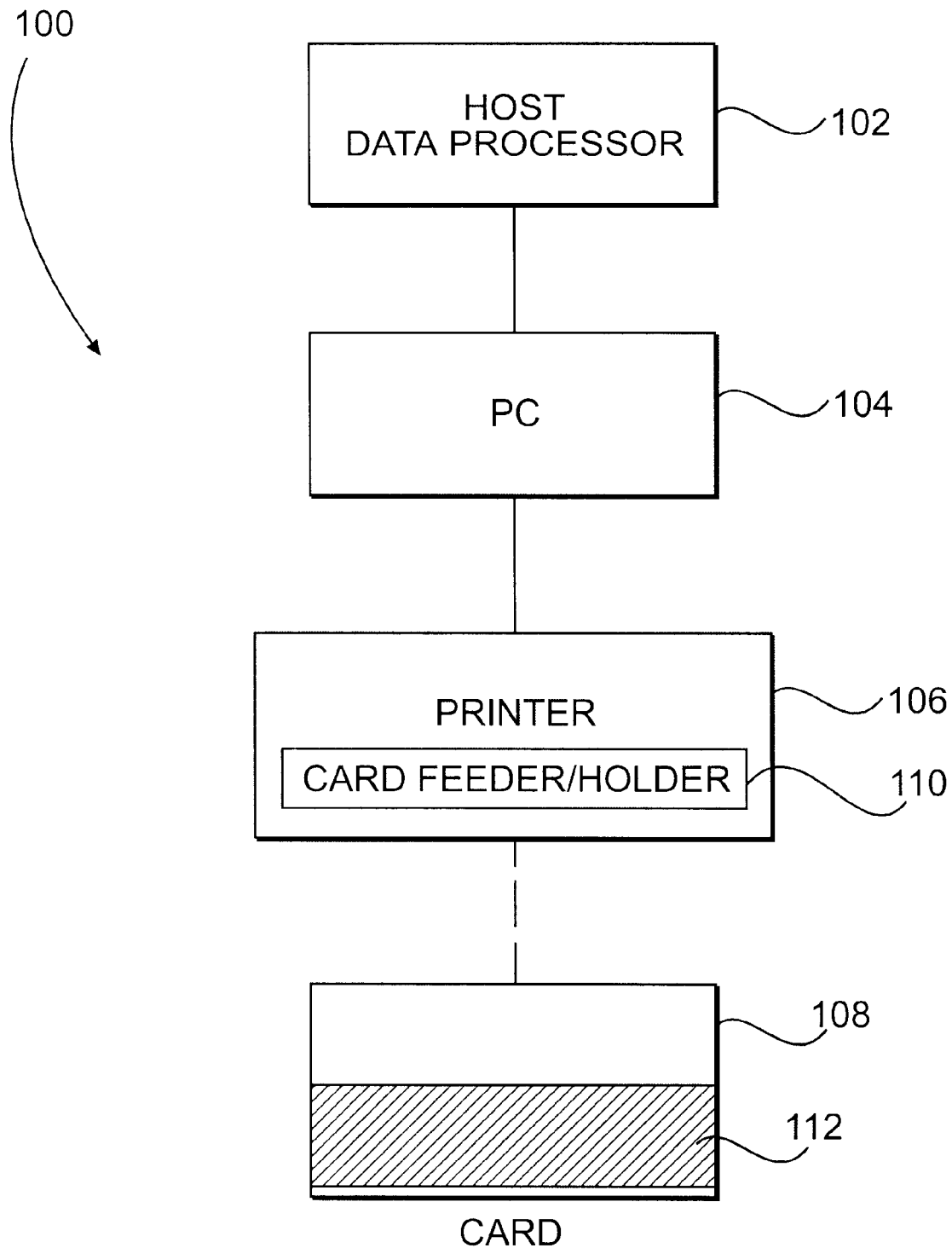
FIG. 1 is a block diagram of a card personalizer system in accordance with the invention.

FIG. 1 shows a block diagram of the preferred embodiment of the card personalizer system 100. The preferred embodiment has four major components, a host data processor 102, a personal computer 104, a printer 106, and the card 108 itself. The printer 106 includes a card feeder/holder 110.

In the preferred embodiment a host data processor 102 provides the large storage capacity and data processing necessary to maintain the many records of the individual clients. A host data processor 102 is typically, a mainframe-type processor such as an IBM, Tandem, or Digital Equipment Corporation computer with sizable storage space, i.e., megabytes or gigabytes. The host data processor 102 is capable of receiving queries from the personal computer 104 and responding to queries from the personal computer 104 almost instantaneously.

In alternative embodiments of the invention, the function of the host data processor 102 and personal computer 104 are performed by one computer that may be located either in the vicinity of the printer 106 or remotely. If the single computer is located remotely from the printer 106, it must be capable of communicating with the printer 106 at sufficient speed to enable a quick card 108 printing time.

The host data processor 102 is preferably located remotely from the personal computer 104 with communications with the personal computer 104 via modem, (not shown), leased line, or other long distance communication method. In this manner, the host data processor 102 is capable of supporting multiple remote card personalizer stations having PC 104 and printer 106 combinations located at remote sites. The preferred connection between the host data processor 102 and PC 104 is a network type connection over a leased line. It is obvious to one skilled in the art that the host data processor 102 and PC 104 may be electronically connected in a variety of ways.

In the preferred embodiment, an IBM or compatible personal computer 104 with a CRT screen and keyboard is utilized. Any of a variety of small computers may be utilized with the invention, for example, Macintosh computers, IBM computers and portable PCs. The personal computer 104 must have a serial or parallel port from which is capable of driving a printing system or printer 106 and a port that enables it to communicate with the host data processor 102.

The personal computer 104 must have sufficient memory and processing capability in order to execute the software for the system, allow user entry of data, and temporarily store the entered data.

In alternative embodiments, the personal computer 104 may be a "dumb terminal" being primarily operated by the host data processor 102. In this alternative embodiment, the dumb terminal simply acts as an user interface and communication point for the host data processor 102.

The printing system 106 of the invention may take a variety of forms such as a dot matrix printer, a bubble jet printer, a laser printer, or a plotter. The printing system 106 of the preferred embodiment includes a Roland Digital Corporation model RP-11 plotter . The printing system 106 must be capable of accepting commands from the personal computer 104. In addition, the printing system 106 must be capable of accepting a plastic card 108 and printing on a plastic card 108 without damaging the card 108.

Many conventional printers are not normally built with the clearance necessary to accept plastic cards that are thicker than normal paper. Commonly plastic cards can range in thickness, however, those used for electronic transactions must be 0.76 mm. In addition, plastic cards that have been embossed with raised lettering 124 have the additional thickness of the raised lettering. ISO standard raised lettering 124 cannot exceed 0.51 mm. Therefore, a printing system 106 suitable for the invention should allow a clearance of approximately (0.76 mm for thickness+0.51 mm for raised lettering 124+0.04 mm of play) 1.31 mm or more in order to operate. Also, plastic cards are less flexible than paper. The rollers and other paper feed mechanisms of many printers require flexible material such as paper to operate properly. Plastic cards will not work in these types of feed mechanisms.

Since the plastic cards are designed to operate in environments ranging from −35° C. and +50° C., printing systems 106 that have rollers or printing parts that operate at higher temperatures are also not suitable for the invention.

Conventional plotters are the most economical and suitable types of printing systems 106 for the current invention. The plotters tend to be inexpensive and provide the necessary height clearance to allow 0.76 mm of card 108 thickness and 0.51 mm of raised lettering. However, all conventional plotters do not have the necessary clearance. A plotter 148 must be chosen that will allow the plotter pen 172 to clear any raised lettering 124 on the card 108.

The printing systems 106 must also have a card feeder or cardholder 106 in order to operate properly. The feeder or holder preferably handles the standard ISO type plastic cards 108. A dot matrix printer with a special cardfeeder can print client information on cards 108. To assist feed mechanisms, carriers that hold the card 108 may be used. These carriers may be made of paper or cardboard.

A variety of cards can be used with this invention. It is preferred that plastic cards 108 made out of polyvinyl chloride or polyester are used with the system. However, metal or other plastics may be used to form the card 108. The preferred cards 108 are standard vault cards 108 with a magnetic stripe 140 of information on the back along with a signature panel, and a raised alphanumeric 124 account number shown on the front. In addition to these standard features, the card 108 has a prepared writing surface 112 on the front to accept information printed by the printing system 106. This prepared writing surface 112 may be either foil, silk screen, paper, vinyl or matted finished plastic.

The cards 108 can be automatically or hand fed into the card feeder/holder 110 prior to ink printing by the print system.

Figure 2A:
FIG. 2a is a depiction of the front of a sample plastic card with logo, raised lettering and a printed portion.

FIG. 2a shows the front of a sample plastic card 108 for use in the card personalizer system 100. The card 108 is preferably made of polyvinyl chloride and is approximately 85.6 mm in width by 53.98 mm in height. In the upper portion of the card 108 an organization's logo 120 may be shown. This logo 120 is placed on the card 108 by coloring the plastic. In a position approximately below the horizontal center line of the card 108 are located raised alphanumeric 124 characters that signify the unique identification of this card 108. It is preferred that the raised alphanumeric 124 characters are located on that portion of the card 108 that is specified by the ISO specifications. Just beneath the raised alphanumeric 124 characters is located a prepared writing surface 112 with a security text 128 background.

In the preferred embodiment the prepared writing surface 112 is a printed foil that is hotstamped to the plastic card 108. Hotstamping is commonly used in the industry to adhere material to the plastic card 108. Hotstamping avoids the use of any adhesive and makes tampering with the foil difficult. In this sample, the security text 128 in the foil of the prepared writing surface 112 is a repetition of the letters EBT. Any of a number of letters or designs may be used in the security text 128 of the prepared writing surface 112. For example, a trademark may be used or a series of wavy lines.

Printed on this prepared writing surface 112 by the process described in this invention, is a persons name "James C. Morrison" 132. The name is printed in dark black lettering contrasting sharply with the foil of the prepared writing surface 112 and security text 128 in the foil of the prepared writing surface 112. It is preferred that the security text 128 in the foil surface be a light color such as orange or green and black ink be used in the printing of the text 132.

If a silk screen process is used to create the prepared writing surface, then the security text 128 should also be silk screened onto the card 108. Hotstamped foil is preferred over silk screening because it is possible to chemically remove a silkscreened writing surface. Silk screening is a known process in the plastic card industry.

On the lower portion of the card 108, below the prepared writing surface, the sample card 108 has an additional logo 136. In addition, beneath the foil of the prepared writing surface 112 and imprinted within the plastic is tamper proof text (not shown). The tamper proof text is preferably a design using the word "void" numerous times. The tamper proof text only appears if the prepared writing surface 112 is removed such as by attempted erasure of the text 132 on the prepared writing surface 112.

Figure 2B:
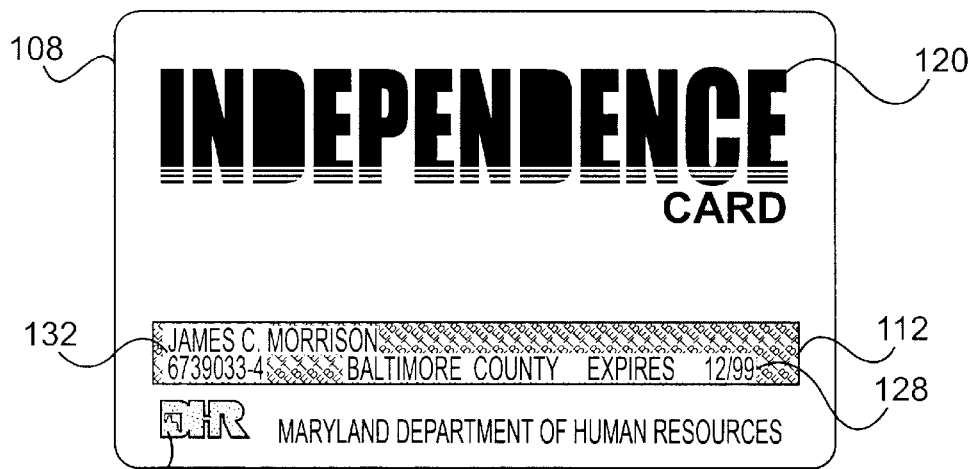
FIG. 2b is a depiction of the front of a sample plastic card with a logo and a printed portion.

FIG. 2b is another front of a sample plastic card 108. This particular sample does not have the raised lettering 124 or any other embossed unique card identification shown. This sample similar to the sample in FIG. 2a also has logos 120, 136 and a prepared writing surface 112 in the bottom half of the front of the plastic card 108.

Printed in the prepared writing surface 112 of FIG. 2b by the process of this invention are the following fields: person's name, person's personal identification number, county of residence and card expiration date. In this example there are four fields of information printed on the prepared writing surface 112. The number of fields of information, the size of the print, the type of fields, and the type of information may be varied.

Figure 2C:
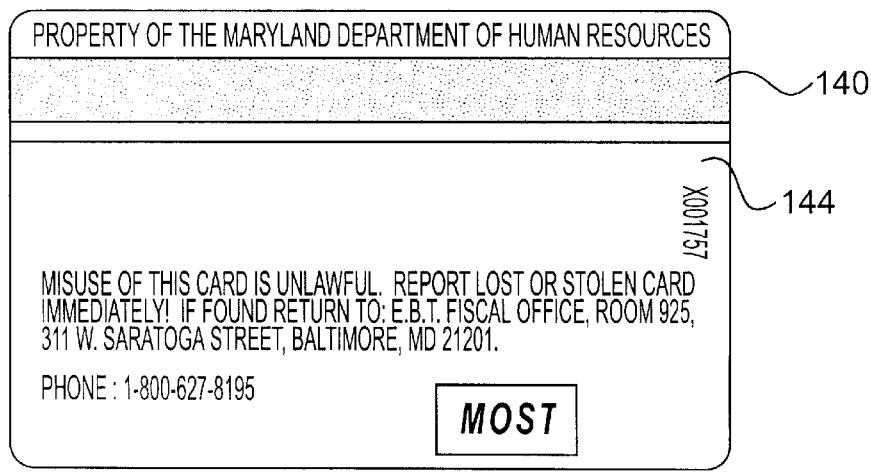
FIG. 2c is a depiction of the back of a sample plastic card with a magnetic stripe and a signature panel.

FIG. 2c is a sample of the back of a plastic card 108. On the back of the plastic card 108 a magnetic stripe 140 and a signature panel are shown. In the preferred embodiment, the magnetic stripe 140 contains the unique card identification number within one of its magnetic tracks. The signature panel located in the upper half of the back of the plastic card 108 may be made of hotstamped foil, hotstamped paper, or silkscreen ink base. In the preferred embodiment the signature panel is made of the same specially prepared writing surface 112 as the front portion of the plastic card 108. The signature panel may also have tamper proof text imprinted on the plastic beneath the surface of the signature panel.

Figure 2D:
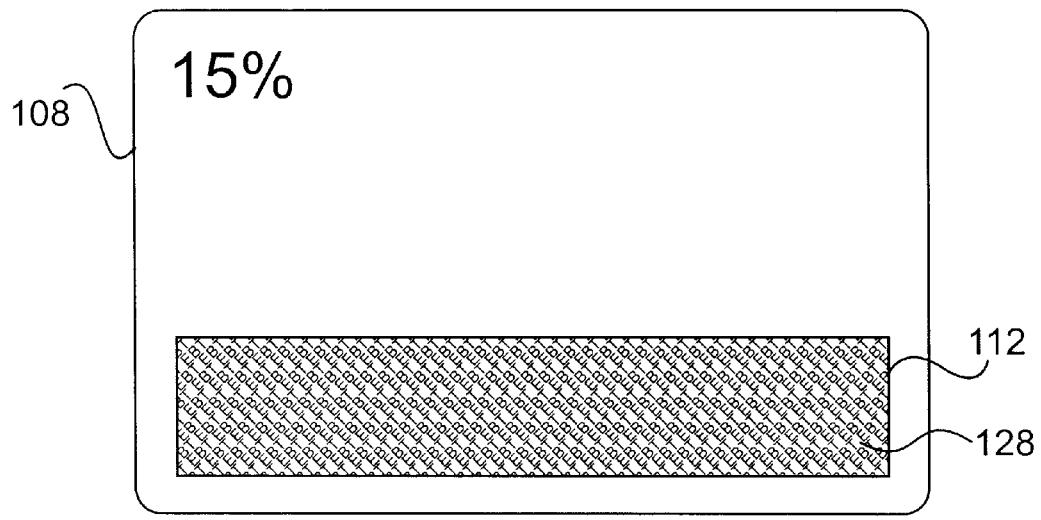
FIG. 2d is a depiction of the front of a sample card which has one prepared writing surface located on the lower portion of the card.

FIG. 2d shows a sample of the front of the plastic card 108 that has the lower two thirds of the front covered by the prepared writing surface 112. This example of the front of a plastic card 108 leaves the upper two thirds of the card 108 available for a unique card identification to be embossed and a logo 120, 136. For many applications of this invention, the size and location of the prepared writing surface 112 in FIG. 2d is preferred. The writing surface 112 in FIG. 2d provides sufficient space for approximately 6 to 8 thirty character fields with type ranging in size from 6 point to 14 point.

The security text 128 that forms part of the prepared writing surface 112 in FIG. 2d has an ink coverage of approximately fifteen percent of the prepared writing surface 112. It is preferred if the ink coverage of the security text 128 is approximately fifteen to twenty percent of the prepared writing surface 112. This range of ink coverage provides a sufficient security text 128 background and allows for the printed text 132 to adequately contrast upon the prepared writing surface 112. The security text 128 helps eliminate the fraudulent replacement of the prepared writing surface 112 with other material.

Figure 2E:
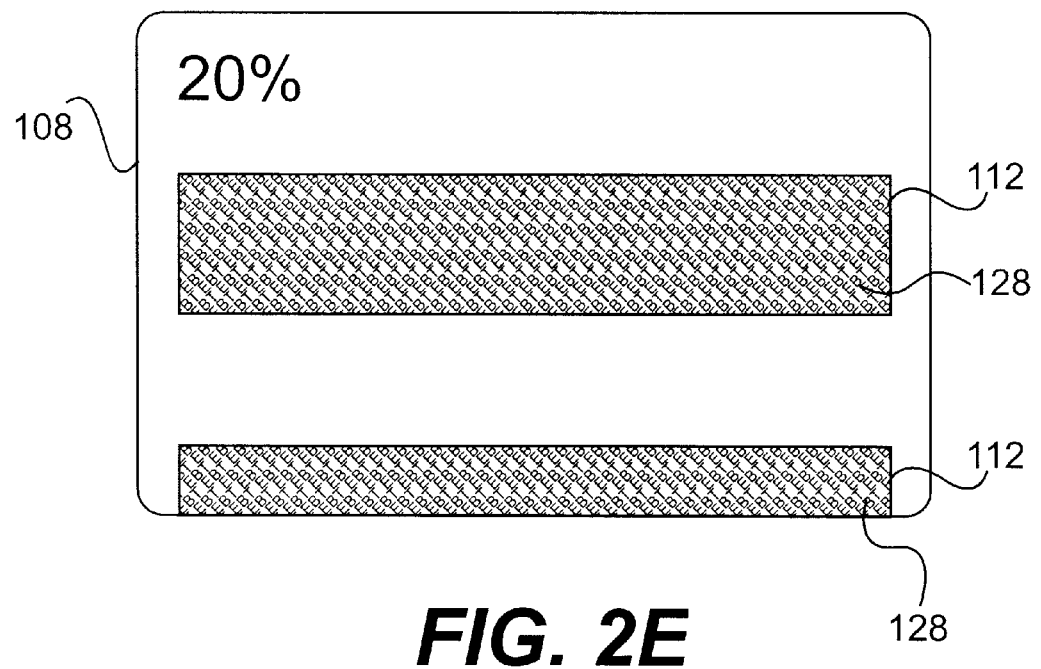
FIG. 2e is a depiction of the front of a sample card which has two prepared writing surfaces.

FIG. 2e shows an example of the front of a plastic card 108 that has two separate prepared writing surfaces. One of the writing surfaces is located approximately in the center of the card 108 and the second prepared writing surface 112 is located at the bottom edge of the card 108 and across the width of the card 108. It is generally preferred that the prepared writing surface 112 does not cover or reach the sides of the plastic card 108.

The prepared writing surfaces 112 shown in FIG. 2e overlay more than one third of the front of the plastic card 108. In this embodiment, the unique card identification number may be embossed on the plastic card 108 between the upper and lower prepared writing surfaces. It is preferred that the prepared writing surfaces do not overlay raised or flat graphic embossing (not shown). The security text 128 of the prepared writing surface 112 shown in FIG. 2e has an ink coverage of approximately twenty percent.

Figure 3:
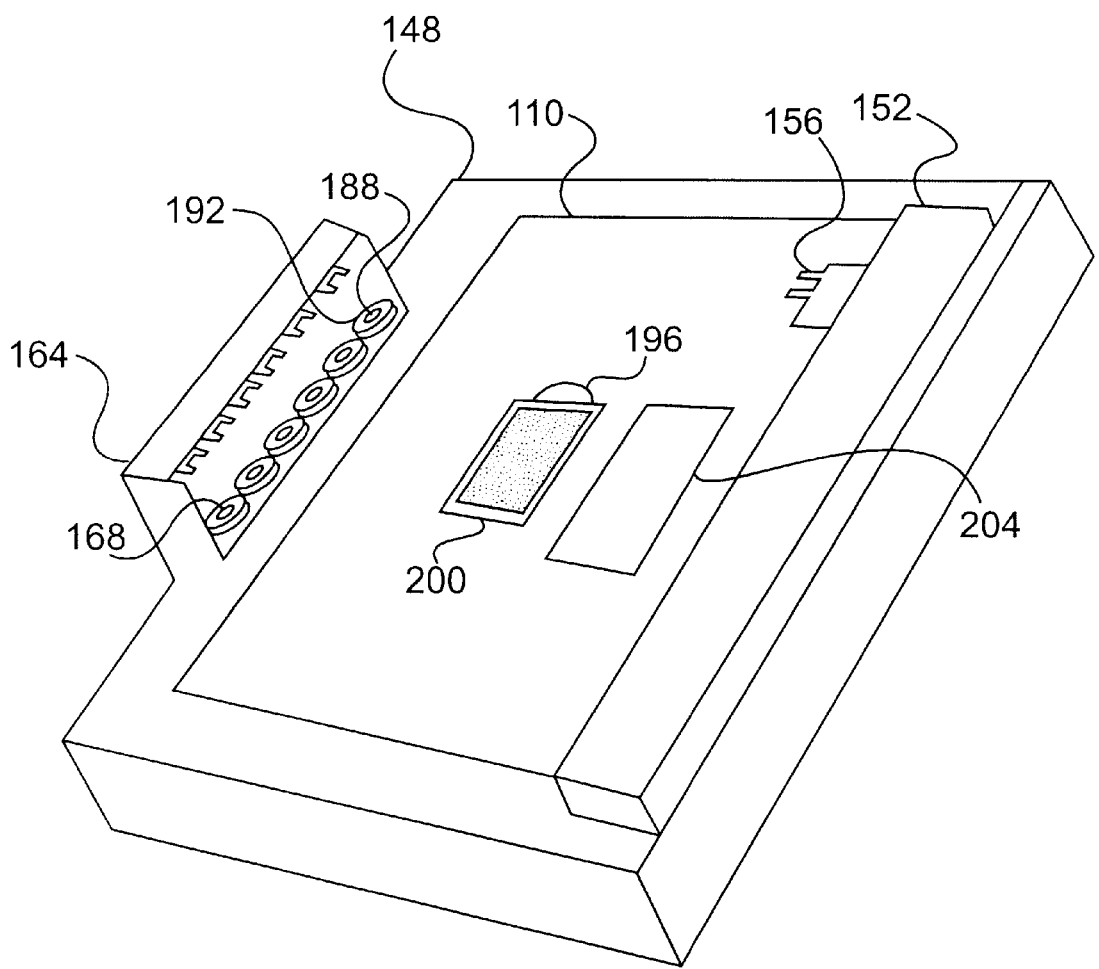
FIG. 3 is a representation of a plotting device.

FIG. 3 is a schematic of the preferred printer 106 system for the invention, a plotting device 148. The plotting device 148 in FIG. 3 has a plotting arm, a pen holder 156, a cardholder 110, and temporary pen storage device 164, which includes gaskets.

The plotting device 148 of FIG. 3 is capable of mounting a pen 172 located in the temporary storage device 164 and moving the pen 172 within the plotting surface. The plotting arm 152 is capable of moving the pen 172 in the x and y directions and in the z direction.

There are two different types of plotting machines that are generally available. The first type of plotting machine is capable of moving the pen 172 only in the x direction and must move the paper in order to provide relative motion between the pen 172 and the paper in the y direction. Hewlet Packard™ produces plotters that move the paper in order to achieve relative motion in the y direction. The second type of plotter 148 has a plotting arm 152 capable of moving in both the x and y direction and does not move the paper.

The preferred type of plotter 148 for this invention is the plotter 148 that does not move the paper. It is preferred that the plastic card 108 remain in a stationary position while the printing system 106 applies ink to the prepared writing surface 112. In order to economically build the card personalizer, it is preferred that a conventional plotter 148 be used in the printing system 106. The preferred plotter 148 is a conventional plotter 148 manufactured by Roland Digital Corporation, Model RP-11.

The plotting device 148 must allow sufficient clearance between pen 172 and card 108 for the pen 172 to avoid collision with any raised alphanumeric 124 characters on the card 108. It is preferred that the prepared writing surface 112 be located at the appropriate height in the z axis to allow adequate pressure for the plotter pen 172 to effectively write on the surface 112.

When the plotter pen 172 is not in use it can be placed in the temporary storage area by movement of the plotting arm 152. The temporary storage area holds the pen 172 by using the lip 176 on the adaptor. The temporary storage area is capable of holding more than one pen 172 and protecting the tip 180 of the pen 172 from damage. The temporary storage area has gaskets 168 in its lower portion that can keep the pen tips 180 from drying. To accomplish this, the plotting arm 152 must place the pen 172 in the temporary storage so that the lower portion of the pen 172 or pen adaptor 184 form a seal with the gasket 168. The inside portion of the gasket 188 protects the tip 180, while the outer portion of the gasket 192 helps create a seal. Once a proper seal is formed, the pen 172 may be left in the gasket 168 for several hours without incurring any damage or negative side effects. If the pen 172 will be constantly in use, there is no need for the temporary storage and the pen 172 may remain on the plotting arm 152 at all times.

Also shown in FIG. 3 is the preferred embodiment for the cardholder 110. The cardholder 110 is preferably made of material that is nonabsorbent, and a material stronger than the plastic of the cards 108. Although the cardholder 110 can be made from paper or cardboard this composition will greatly reduce the durability and performance of the cardholder 110. It is best if a laminated material, PVC, or formica is used for the cardholder 110.

In the preferred embodiment, the cardholder 110 replaces the magnetic paper holder that is found in a standard conventional plotter. The cardholder 110 is a sheet approximately 9-½ inches by 12-½ inches and has a thickness of approximately 0.03 inches. It is preferred that the cardholder 110 be at least the same thickness as the card 108. Two indentations 200, 196 are located in the center of the cardholder 110 sheet. One indentation 200 is the size of the card 108 and the second is a finger hole 196. The finger hole 196 is preferably twice the size of the end of a human finger or a semicircle of approximately 0.75 inch radius. The finger hole 196 allows for the easy removal of the plastic card 108 from the card indentation 200 after printing.

This card indentation 200 must fit the card 108 snugly so as to avoid any movement of the card 108 during the printing process. Any movement of the card 108 during the printing process will negatively effect the quality of the printing.

The cardholder 110 is also equipped with a writing portion 204 for automatically priming the pen 172. The writing portion 204 of the preferred embodiment is disposable paper and is located in the vicinity of the card indentation 200.

In an alternative embodiment, the cardholder 110 may be made of plastic that is raised around the border of the area in which the card 108 is to be held. In this manner, the card 108 would be surrounded by a raised plastic ridge. In this embodiment, the finger hole 196 may be carved out of the plastic surface.

Alternatively, four corners may be formed from plastic material to hold the four corners of the plastic card 108. Using this method, it is possible to eliminate the finger hole 196 and allow the user to remove the card 108 with his fingertip from any of the four sides. A card holding method similar to that used in a manual credit card charging machine (a "zip-zap" machine) may also be used.

For a dot matrix or similar printing system 106, a card feeder capable of handling at least 1.31 mm of thickness, 53.98 mm in height and 85.6 mm in width should be used. It is preferred that the card feeder be of the flat rolling variety since most cards 108 are not flexible enough to pass around rollers. The preferred dot matrix card feeder is one that operates in conjunction with a card carrier. The card carrier is a paper or cardboard sheet that is larger than the card 108 and is capable of holding the card 108. The preferred card carrier is 8-½×11 inches and carries the card 108 in the center by holding the card 108 with four corner flaps. Envelope size card carriers are well known in the industry.

With the use of a card carrier, the card feeder is designed for a "full page" feed through the printing device. It will be obvious to those skilled in the art that there are many variations of the cardholder 110 that will work in the printing system 106.

Figure 4A:
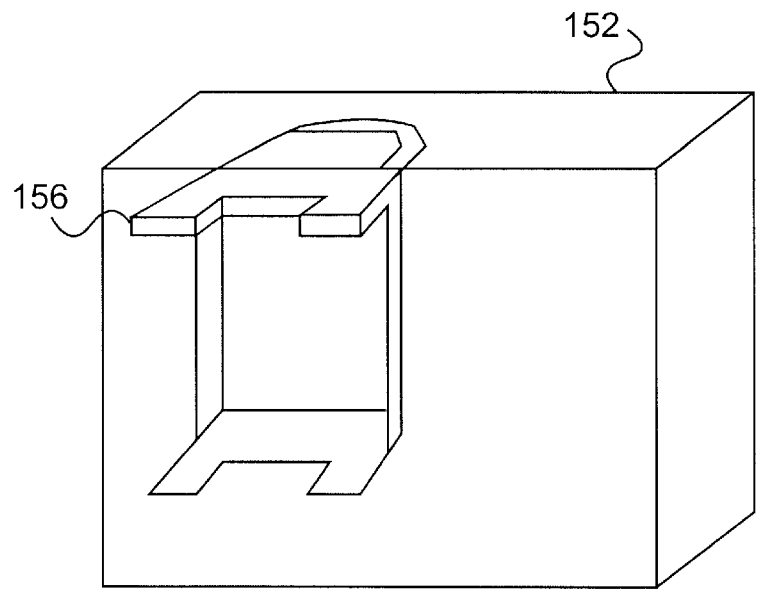
FIG. 4a is a representation of the plotting arm.
Figure 4B:
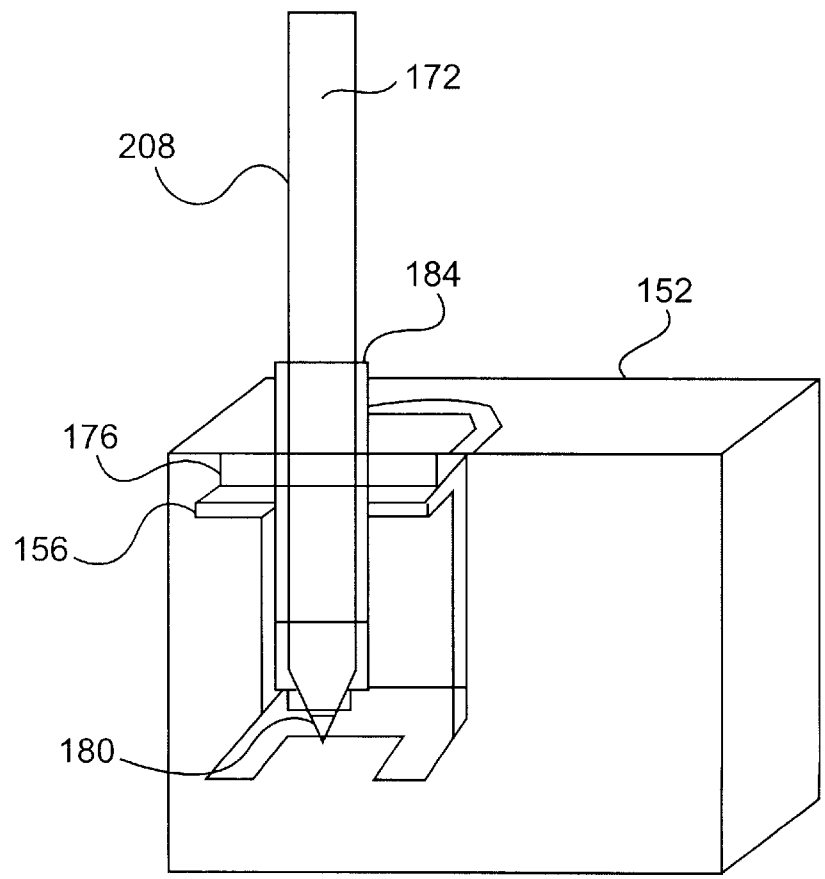
FIG. 4b is a representation of the plotting arm holding a printing pen.

FIG. 4a shows the plotter arm 152 alone and FIG. 4b shows the plotter arm 152 holding a pen 172. An adaptor 184 with a lip 176 is used in order to allow the plotting arm 152 to pick up and hold the pen 172. The plotting arm 152 moves the pen 172 in the horizontal (x) and vertical (y) direction as well as up and down in height (the z direction).

The card's prepared writing surface 112 must be at the appropriate height for the plotting arm 152 to lower the pen 172 and apply sufficient pressure to write on the prepared writing surface 112. The card 108 shown here is in the center of the plotter 148 and is being held in place by the cardholder 110. The card 108 may be located anywhere that is within reach of the plotter arm.

The adaptor 184 is different for each plotting system. A disposable pen 172 that fits within a plotter's adaptor 184 or a refillable pen 172 that is appropriate for the particular plotter 148 must be used. The adaptor 184 is held by the plotter arm fork 156 grasping beneath the adaptor lip 176.

Figure 5:
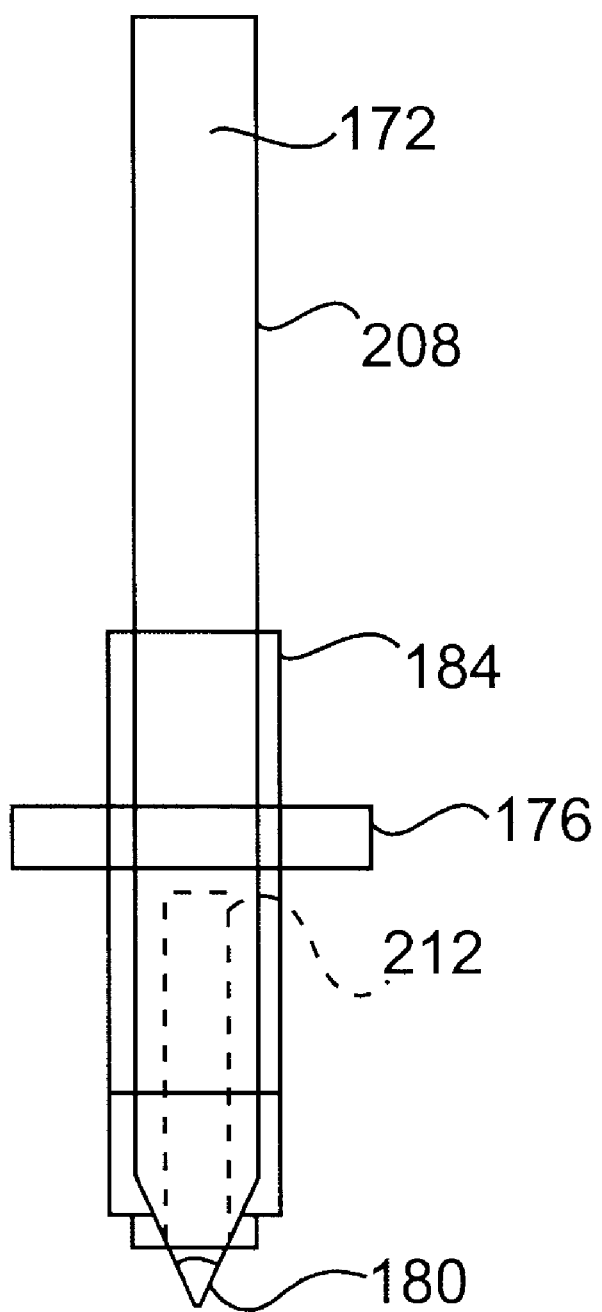
FIG. 5 is a representation of a sample pen.

FIG. 5 shows a sample disposable pen 172 with a plotter adaptor 184 attached. The plotter adaptor 184 is located towards the tip 180 of the disposable pen 172. The upper portion of the pen 172 or pen housing, that extends beyond the adaptor 184 is not required for the invention. As long as the ink holding area 212 on the inside of the pen 172 is sealed no additional pen housing 208 is necessary. The preferred pen housing 208 is made of polypropylene and the pen adaptor 184 is made from similar material. The pen adaptor 184 is a sleeve-like component fitting snugly over the lower portion of the pen housing 208. The adaptor 184 has a lip 176 that holds the pen 172 in the plotter arm fork 156.

The lower part of the pen housing 208 or the adaptor 184 is used to create the seal against the gaskets 168 of the temporary storage. The adaptor 184 or pen housing 208 must be properly shaped to seal against the gasket.

In order for the printing on the card 108 to adhere on a permanent basis, the appropriate combination of prepared writing surface 112 material, ink, ink delivery system, tip 180, and pen 172 pressure should be used. In the preferred embodiment the prepared writing surface 112 is made of hotstamped foil, a Roland Digital Corporation plotter 148 is used, and a Sharpie™ brand extra fine point disposable pen 172 is used. The Sharpie™ pen (35,000 series) is manufactured by Sanford Corporation, 2711 Washington Boulevard, Bellwood, Ill. 60104. The Sharpie™ ultra fine and fine pen may also be utilized. The Sharpie™ pens are permanent markers with a shelf life of over 3 years and appropriately 1,000 feet of write length. Disposable pens are preferred since they are easy to use and are economical for users of the system.

The ink that is used in the system must be a permanent ink which is quick drying and highly water-resistant. The ink needs to dry quickly in order to prevent a client from smudging the ink shortly after printing. Further, the combination of paper and ink must remain smudge resistent. It is preferred that high intensity black ink is utilized, however, any color of ink that is sufficiently dark to create a high contrast with the prepared writing surface 112 can be utilized. The ink should be waterproof and adhere appropriately to the prepared writing surface 112 material. The ink must also be non-beading and be applied smoothly with a consistent delivery of ink by the ink delivery system and tip 180 to the prepared writing surface 112. Inks using Glycol Ethers as solvents are preferred since they are alcohol resistant.

Various pen tips 180 may be used with the plotting system. For example, ball point, fiber, stainless steel, tungsten, and mechanical pen tips may be used. Each of the pen tips has certain advantages and disadvantages. The ball point pen tip does not always roll evenly and does not deliver ink consistently. The fiber tip pen has a tendency to dry and clog with permanent liquid ink. The fiber tip pen is also subject to damage from abrasions.

The preferred pen tip 180 is one that is made from extruded plastic with stored ink in cotton or other absorbent materials. The preferred pen 172, the Sharpie™ pen, has this type of tip 180. The extruded plastic tip 180 is resistant to abrasion and has a long life.

The pressure that is applied by the plotting arm 152 onto the prepared writing surface 112 is critical with certain types of pen tips. For example, with a ball point pen tip or a mechanical pen tip, strong pressure is necessary to give uniform ink flow. With other types of pen tips such as the Sharpie™ pen tip 180, the amount of pressure supplied by the plotting arm 152 onto the prepared writing surface 112 is not as critical.

In addition, a pen's 172 ink delivery system from the ink storage area to the end of the tip 180 on the pen 172, must be able to consistently deliver permanent waterproof ink. Any ink, ink delivery system, and tip that clogs or quickly dries out will not function well with the plotting system.

The preferred pen 172 holds ink in the pen housing 208 in a cellophane-type tube 212 filled with absorbent cotton-like material. A denser absorbent material approximately 1 inch in length provides a path from the ink pool in the cellophane tube to the writing surface 112. The ink travels from the absorbent cotton-like material to the denser absorbent and the writing surface 112 in a capillary fashion. The cellophane tube is connected to extruded plastic forming the tip 180. The denser material is protected by a covering of extruded plastic near the end of the tip 180. The preferred pen 172 resists clogging.

Regardless of the type of pen used, because the pen 172 may remain unused for long periods of time, a pen priming procedure is necessary to ensure consistent printing. It is preferred that an automatic pen priming procedure be used whenever the pen 172 has remained unused for more than five minutes. This automatic procedure simply instructs the plotter 148 to use the pen 172 on a separate writing surface 204, such as a piece of paper, in order to wet the tip 180 and prime the pen 172. A portion of the cardholder 110 is equipped with an appropriate writing surface 112 for the automatic pen priming. Sample text or symbols may be used. If a pen 172 has been out of service for more than thirty minutes, it is recommended that a manual priming procedure be used. The operator of the plotter 148 must remove the pen 172 and manually prime the pen 172 by using it on a piece of paper until the tip 180 consistently delivers ink. Upon completion of the manual procedure the pen 172 may be returned to the plotting arm 152.

The ink delivery system of the preferred embodiment is a capillary-type system. The ink storage of the preferred pen 172 is in an absorbent material which exudes the ink when pressure is applied.

It is preferred that the end of the tip 180 of the pen 172 be relatively small within the "fine" to "ultra fine" point designation. The ideal size is "extra fine" point or approximately a 0.4 mm line width. This size pen tip 180 writes legibly and small enough to allow room for sufficient personal information within the prepared writing surface 112.

Figure 6:
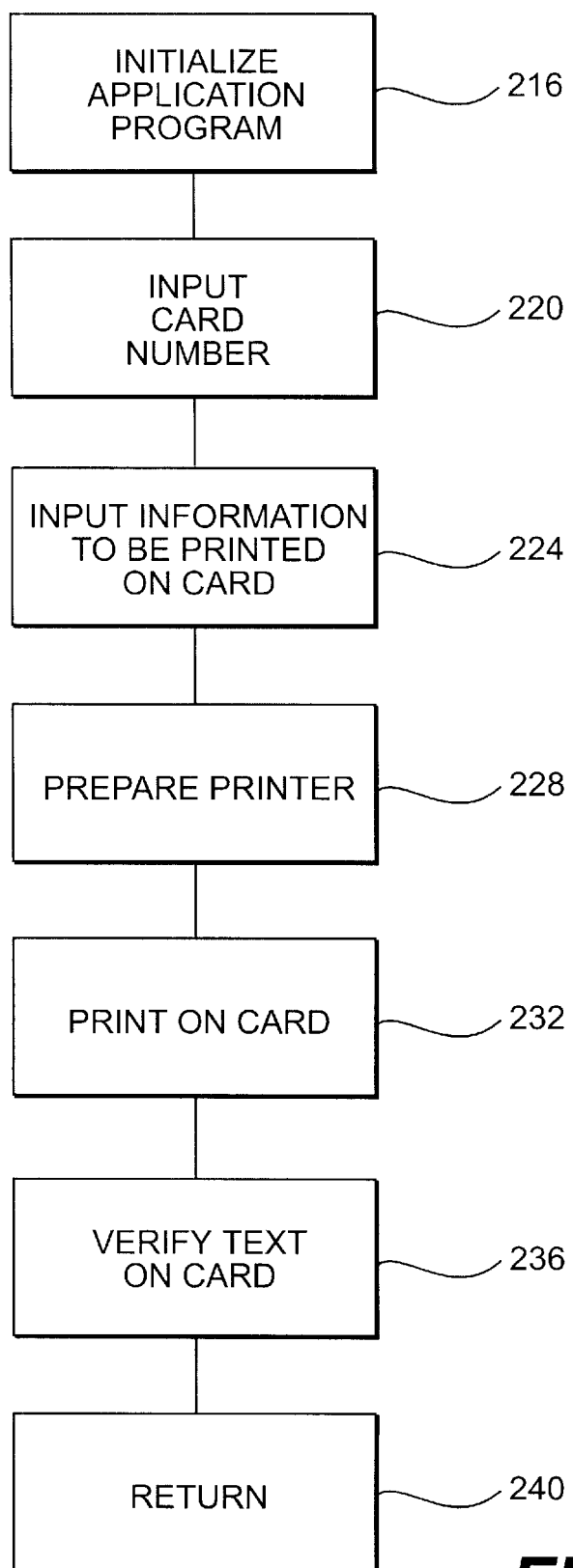
FIG. 6 is a high level, functional flowchart of the system's overall operation.

FIG. 6 is a high level flow chart that shows the basic steps that are necessary for the card personalizer system 100 to operate. The first step in using the system is the initialization of the computer application's program 216 that allows operator interface and runs the printing system 106. Once the program has been initialized, it must allow entry of the unique card identification. For most embodiments this will simply be an entry screen for a card number 220. Following entry of the card number 220 the user will be prompted to enter information that will be printed on the card 224. This information will generally be personal information related to the individual client.

Following the initialization and data entry, the printer 106 must be prepared 228 for printing on the card. This preparation will generally include initialization of the printing system 106 by the computer application's program and the manual feed or automatic feed of the card 108. Once the printer 106 has been prepared, the system may proceed to print information on the card 232. Depending on the type of printing system 106 that is utilized, the card 108 may either be fed through the printing system 106 or may remain in a stationary position.

After the system has printed the information on the prepared writing surface 112 of the card 108, the operator must verify that the text 236 does appear on the card 108 and that is correctly printed. If the text 132 does not appear or there are errors in the printing, the system may either attempt to reprint the information on the same card 108 or print a new card 108 for the same client. In addition, the system is now ready to return 240 to earlier step and receive data for another new client.

Figure 7A:
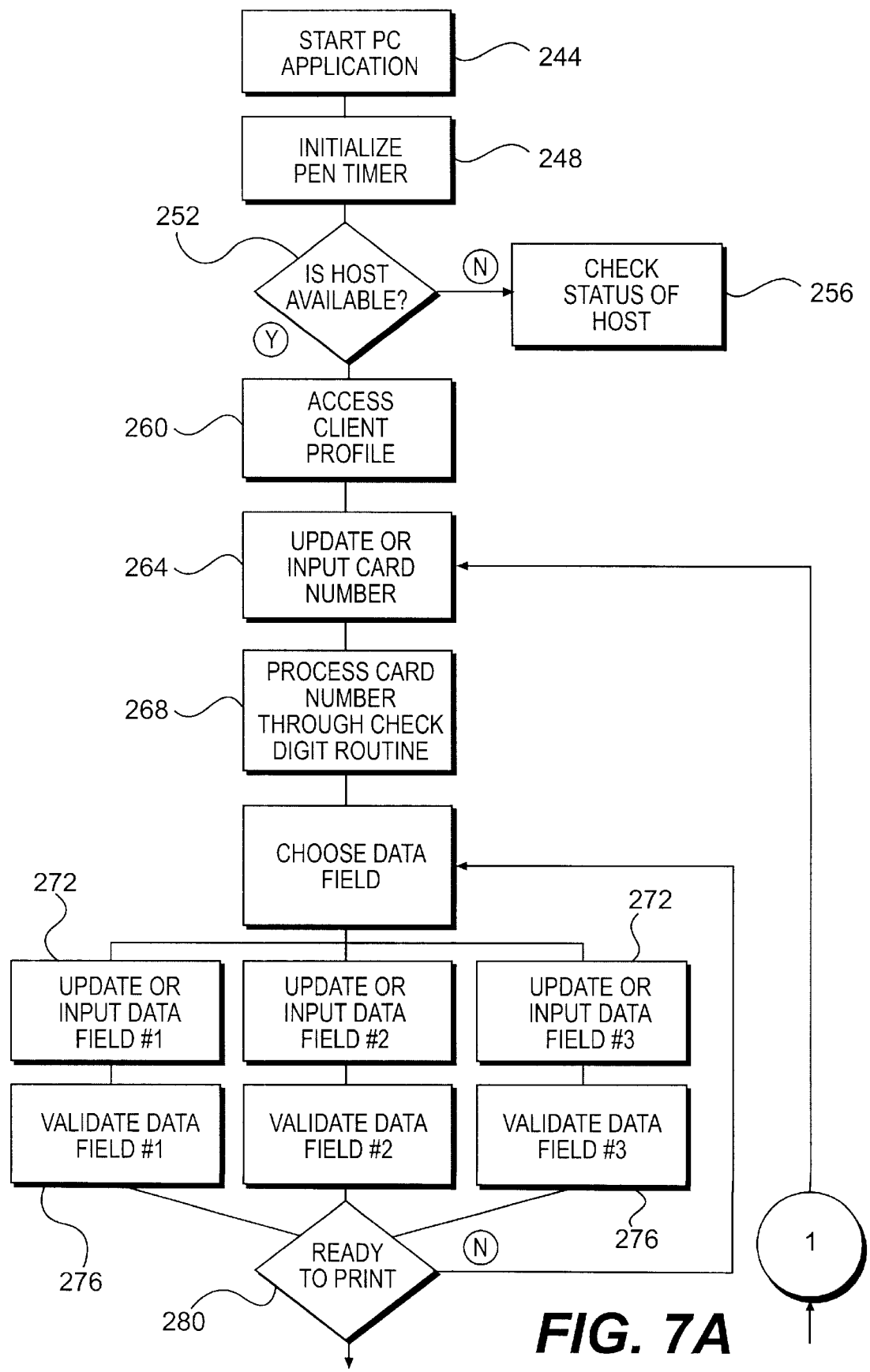
FIGS. 7a and 7b combine to form a detailed flowchart of the personal computer application program when a host computer is utilized.
Figure 7B:
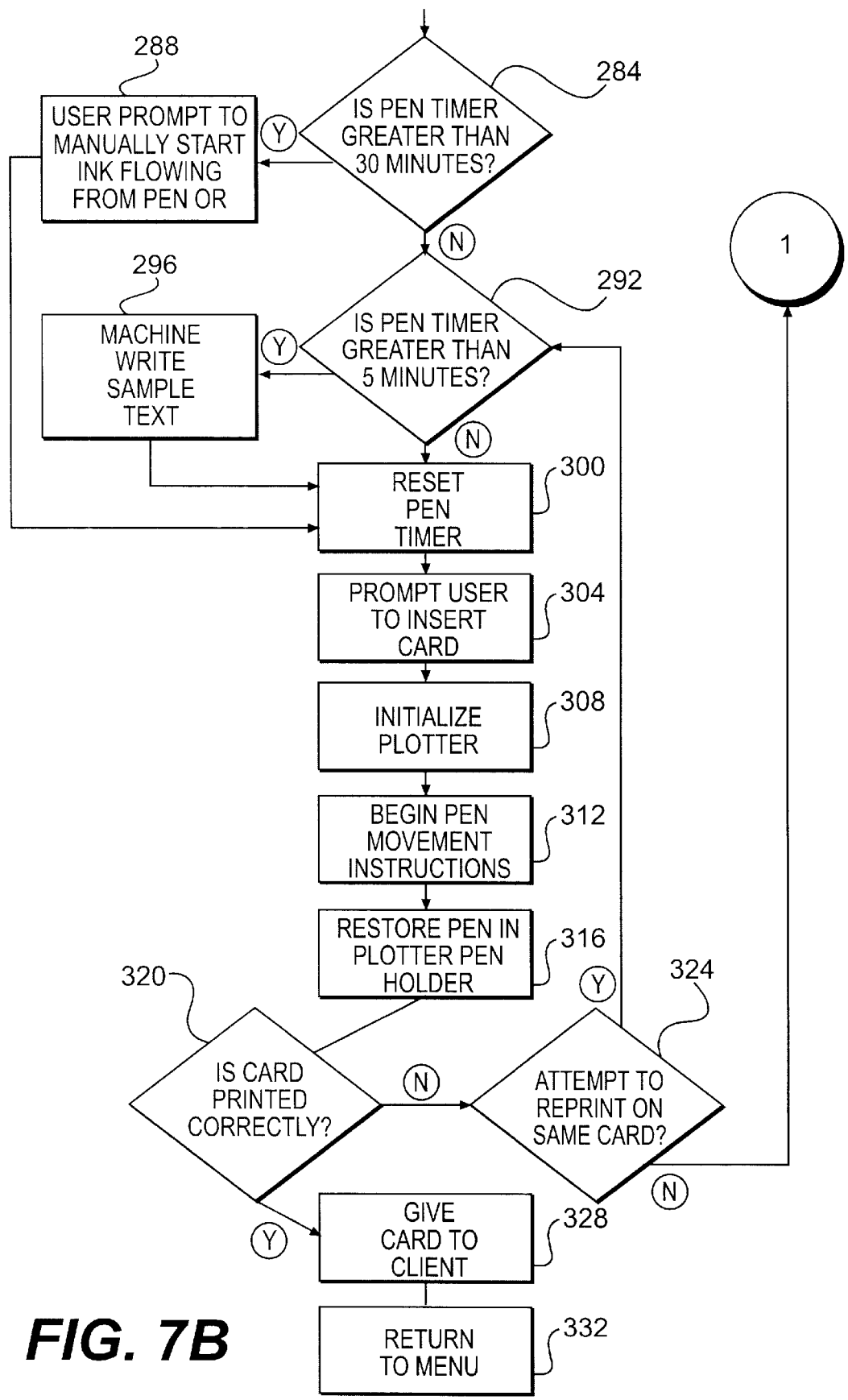

FIGS. 7a and 7b together form a software flow chart for a card personalizer application program running on a personal computer 104 system in conjunction with a host data processor 102. The first step in the software flow chart is to start the PC application 244 and initialize any variables in the application. The next step is to initialize the pen timer 248 so that the subroutines related to the pen 172 can determine that the pen 172 may have been idle for a long period of time.

At this point in the process, the personal computer 104 must check to see that the host data processor 102 is available 252. If communication with the host data processor 102 is not successful, then the status of the host data processor 102 and communications connection with the host data processor 102 must be checked 256.

If the host data processor 102 is available, then the application program accesses the stored client profiles 260 at the host. Now the program is ready to accept an update or input of a unique card number 264. The program will prompt the operator to enter the card number with an update input card number entry screen 336 (discussed later). The entry of the card number is made by the operator using a keyboard.

Following entry of the card number 264, the program processes the card number through a check digit routine 268. If the card number is acceptable, the program continues. If the card number 264 is not acceptable, the program returns the user to the update or input card number entry screen.

Following entry of the card number, the operator is prompted by another screen on his display (CRT) to update or input client personal information for fields one, two and/or three 272. Following entry of the data, the program validates the data entry to ensure that it is acceptable 276. When the host computer 102 is utilized with the system, various card number confirmations and data validation 276 are possible. The host can ensure that only authorized card numbers are entered into the system. The data validation may be performed by the PC 104, host 102, or both 104, 102. If the data is not acceptable, the operator is prompted to correct the data. Following entry of the data the operator is queried as to whether he has completed his data entry and is ready to print 280. If the operator is not ready to print he is returned for further data entry 272.

If the operator is ready to print, the software determines if the pen 172 has been resting for thirty minutes or longer 284. If the pen 172 has been sitting for more than thirty minutes the user is prompted to manually start the ink flowing from the pen 288. The user does this by removing the pen 172 from the plotter 148 and using the pen 172 on a sheet of paper until it writes properly. If the pen 172 has not been sitting idle for more than thirty minutes, the program determines whether the pen 172 has been sitting idle for more than five minutes 292. If the pen 172 has been sitting for more than five minutes, the pen 172 is automatically primed by the machine 296 using the pen 172 to print on a separate small piece of paper 204. The plotter 148 may use sample text or greater than (<) and less than (>) signs on the small piece of paper 204 to prime the pen 172. Following the manual 288 or automatic 296 pen priming, the pen timer is reset to zero 300.

The system software now prompts the user to insert or feed a plastic card 304 into the print system 106. In the preferred embodiment, the operator is prompted to place a card 108 in the card indentation 200 of the cardholder 110 in the center of the plotter 148. The plotter 148 is then initialized by the software 308 to ensure that the x and y coordinates of the plotting arm 152 are correct and that the plotting arm 152 has a pen 172 mounted. Now the system is ready to print.

The software provides the plotter 148 with pen 172 movement instructions 312. When the pen 172 movement instructions and the printing are completed, the plotter 148 places the pen 172 in the temporary storage area 164 sealing 316 the pen tip 180 against the gasket 168. The software then queries the operator as to whether the card 108 has been printed correctly 320.

If the card 108 has not been printed correctly, the operator is asked whether he wishes to reprint on the same card 324 or begin anew with a new plastic card. If the card 108 has no printing due to an error by the plotter: the operator may wish to reprint on the same card 108. If this is the case, the software will return to the pen priming subroutines 292.

If the card 108 is rendered unusable, the software will return the operator to the point where he may enter a new card 108 and new card number 264. If the card 108 has been printed correctly and is acceptable, the card 108 may now be issued to the client 328 and the software will return to the main menu 332 awaiting further key entries by the operator.

In alternative embodiments where no host data processing system is used, the steps of determining whether the host is available and checking the status of the host data processor 102 may be eliminated. No confirmations or data validations will be received by the host.

In an alternative embodiment where the host data processor 102 and personal computer 104 do not communicate during each client interview for card 108 issuance, the card number and client information may be sent to the host data processor 102 on a regularly scheduled basis (i.e., daily) in a batch fashion. Using batch transmissions to the host data processor 102 eliminates the ability to confirm card numbers and validate client personal data. However, batch transmissions will decrease the costs of communicating between the personal computer 104 and host data processing system.

In another alternative embodiment, all the computer and software functions may be performed at the host data processing site and the host data processor 102 may communicate directly with the printing system 106. This embodiment requires close coordination between the operator of the printing system 106 at the local site and the operator of the host data processor 102 at the central site. This coordination may be accomplished by a telephone conversation between the remotely located operator and the operator at the host data processing site.

The storage and recording functions of the data processor 102 may also be performed by personal computer 104. In this embodiment, accessing client profile confirming card numbers and validating data will all be performed by a single computer.

FIGS. 8a through 8d are sample operator entry screens 336 for the personal computer 104 software. In particular, the screens 336 are samples of operator entry screens 336 for an IBM-compatible computer running the card personalizer software application in a windows environment. Similar operator/user screens may be used on a Macintosh® system.

Figure 8A:
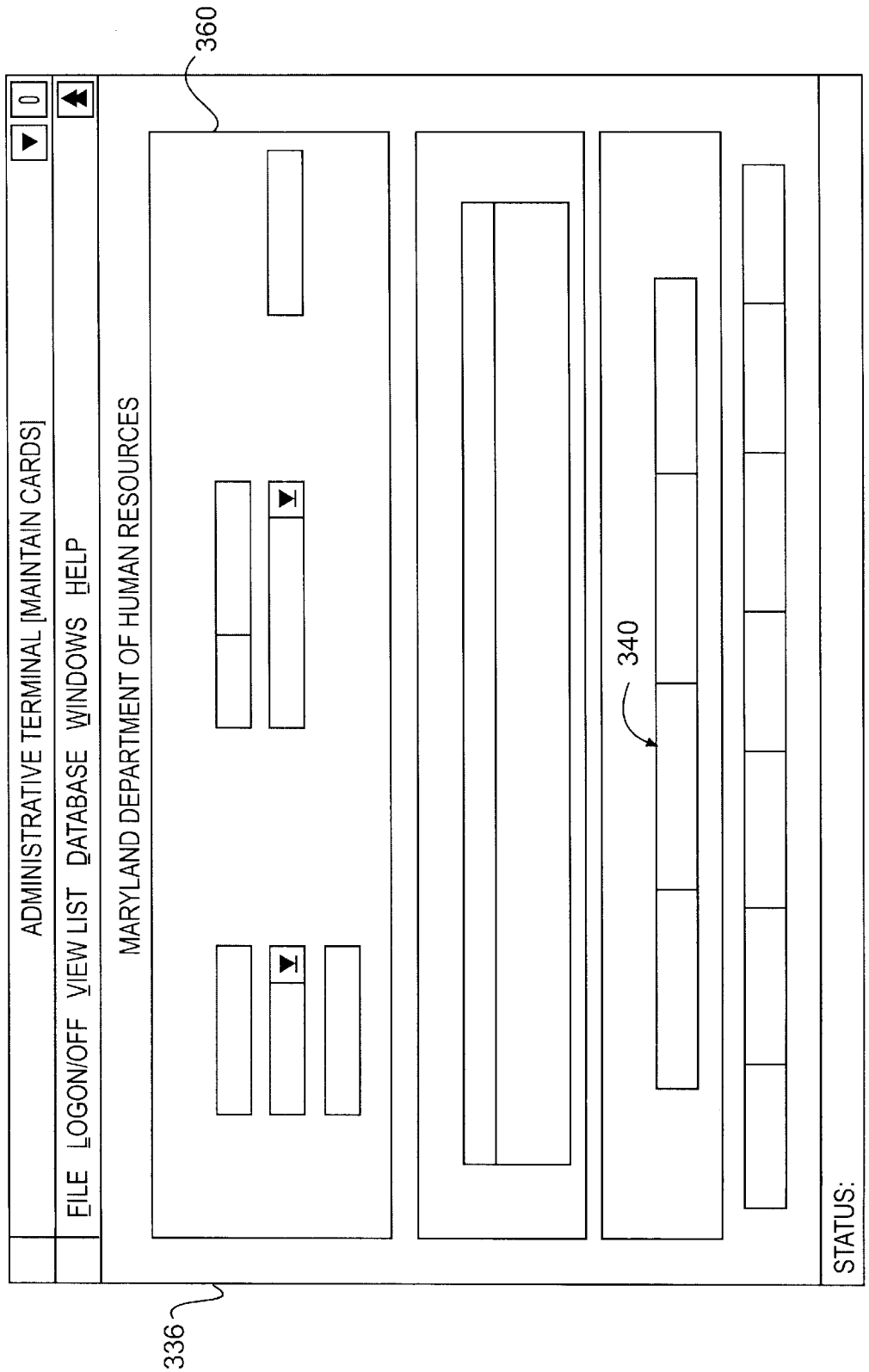
FIGS. 8a–8d are sample user entry screens for the personal computer software of FIGS. 6, 7a and 7b.
Figure 8B:
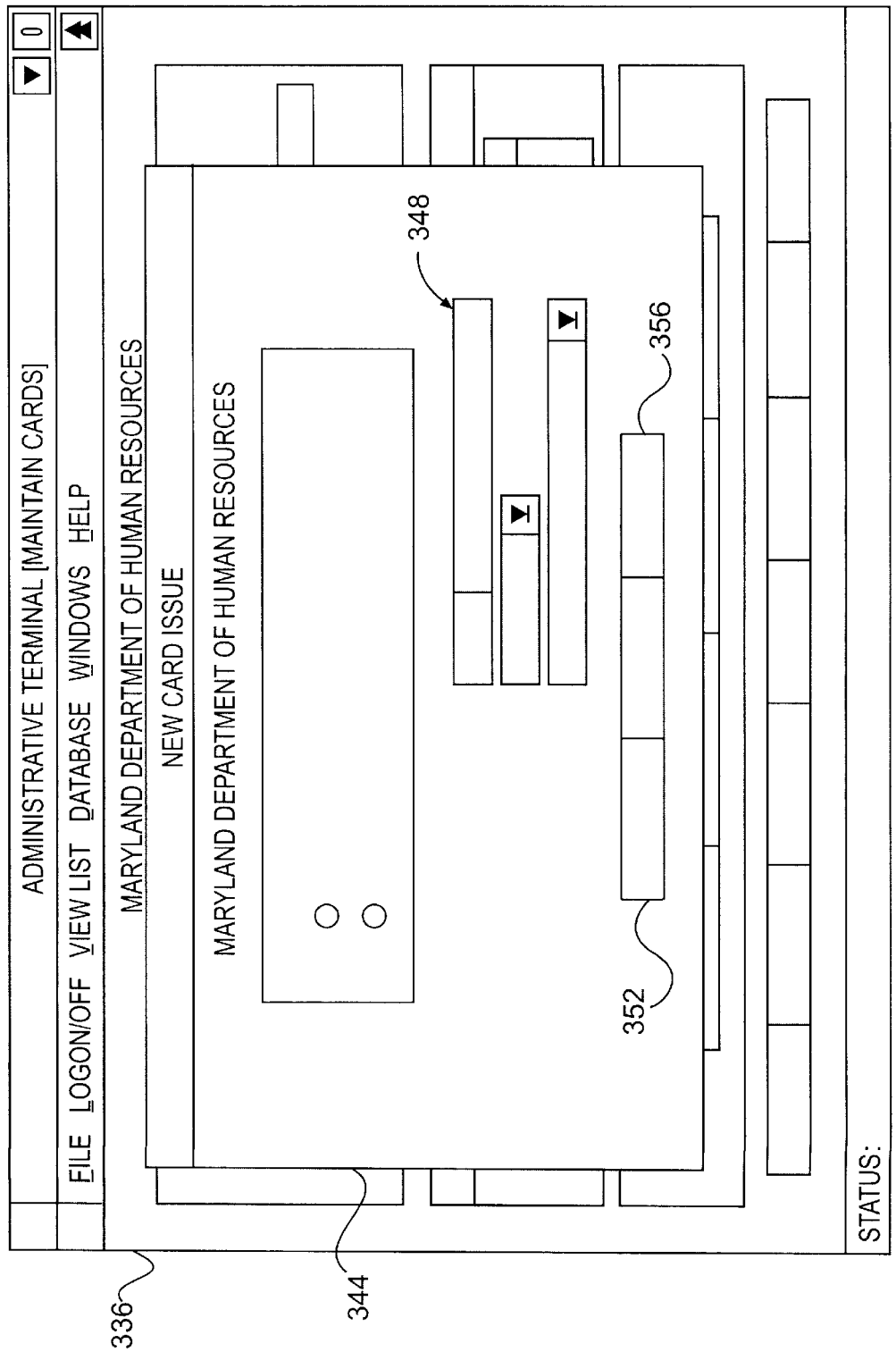

FIGS. 8a and 8b show the sequence of operator entry screens 336 for entering a new client and issuing a new card 108. The initial screen requires entering the client's first and last name, an expiration date, an issuing date, and other client personal data in the information block 360. This particular software application program assigns the client a unique number to identify that client. Following entry of the new client information, the operator may select the "new card issue" button 340 with his mouse or cursor.

Upon selection of "new card issue" 340 a dialog box 344 appears layered over the operator entry screen 336. In the dialog box 344 the operator may select to issue the card 108 with or without the personalized printing 132. The operator must enter the unique vault card number 348 in the field entitled "vault card number" 348. Then the operator may either select "O.K." 352, which will allow the application's program to process the dialog box 344 and print the card 108, or may select to "cancel" 356 out of the dialog box 344 and return to the operator entry screen 336. If the card 108 prints acceptably, the client is given his card 108 and the client interview is terminated. If the card 108 does not print properly, the operator may return to the "new card issue" dialog box 344 and reprint the card 108 or issue another new card 108.

Some examples of possible client personal data that may be used in text fields on the operator entry screens 336 are name, card number, social security number, membership number, case number, address, expiration date, date of enrollment, date of membership, issue date of card, date of birth, sex, height, weight, physical features, dependents, medical coverage, medical conditions, issuing location, emergency contacts, etc.

Figure 8C:
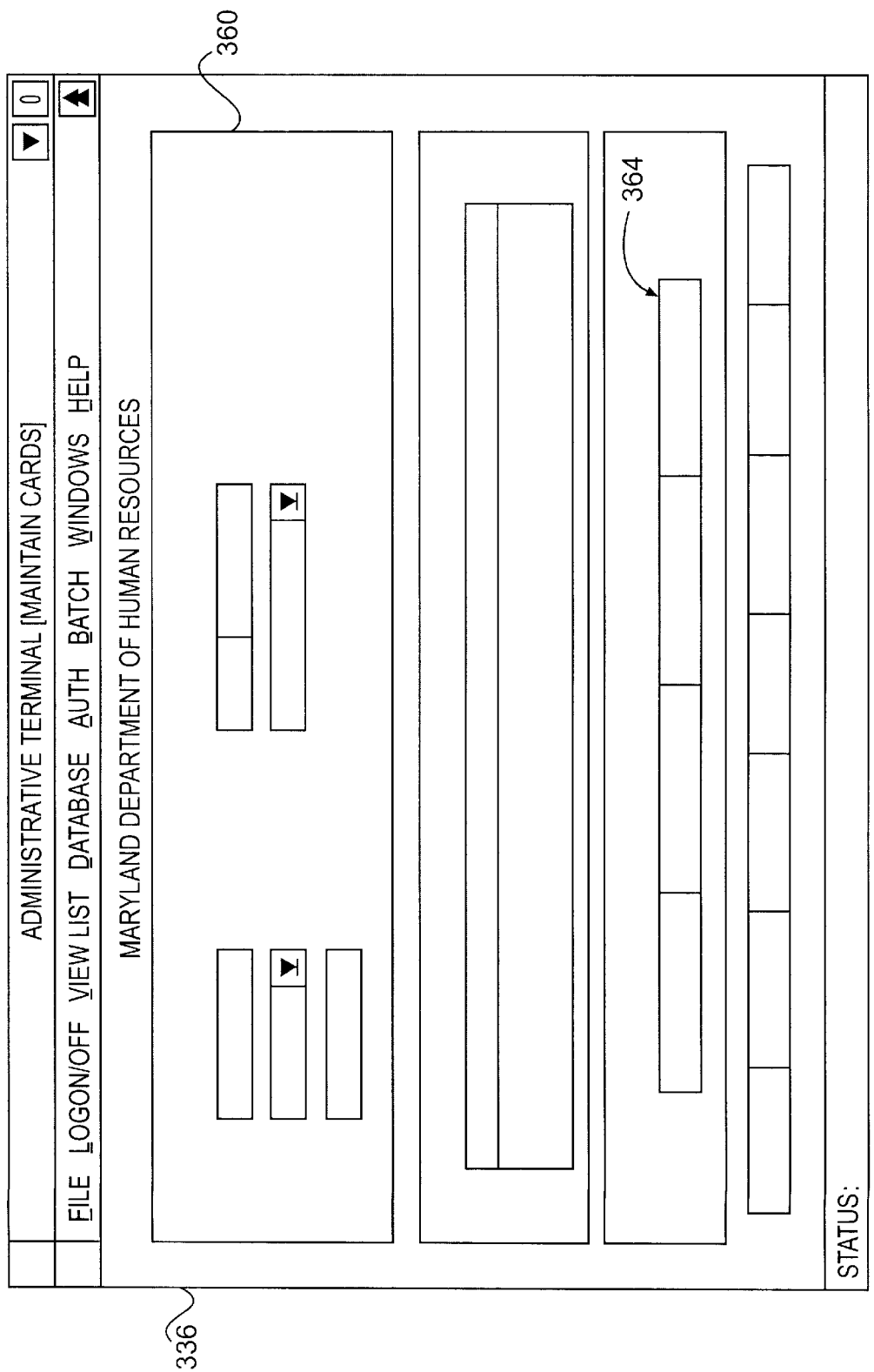
Figure 8D:
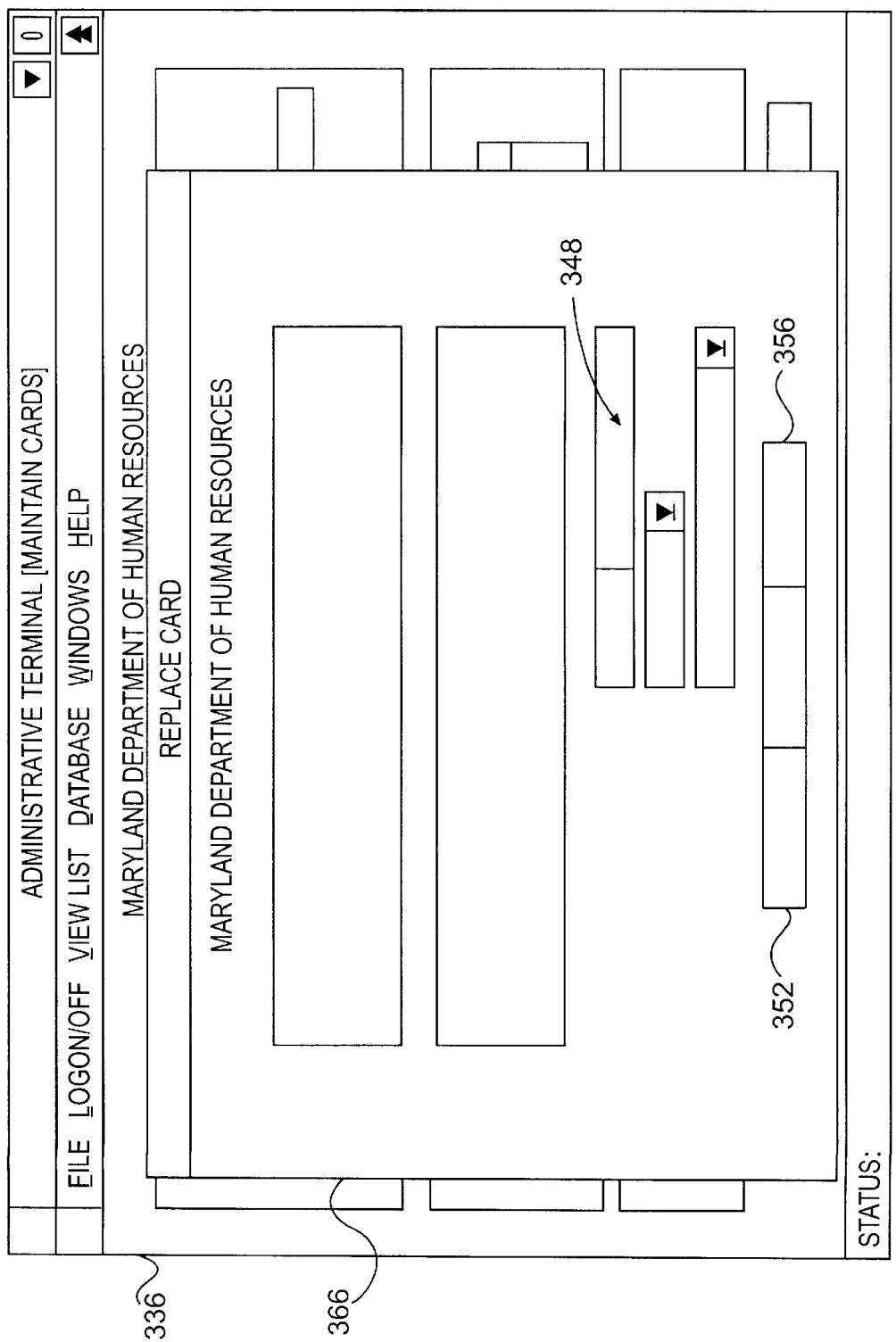

FIGS. 8c and 8d show a series of screens 336 for replacing a client's lost, stolen or damaged card 108. FIGS. 8c and 8a may be identical or nearly identical operator entry screens 336. In FIG. 8c the client (or customer) is an existing card carrying client and the fields of information 360 are already filled. These fields 360 may be changed or augmented as necessary during the client interview session. Upon confirming that the fields are correctly filled in, the operator selects the "replace card" icon 364 from the lower part of the screen.

The "replace card" dialogue box 366 shown in 8d will then be overlayed on the operator entry screen 336. The "replace card" dialogue box 366 requires the operator to enter a new card number in the appropriate field. Using the "replace card" dialogue box 366 the operator may select to print the personal information on the card 108 or issue the card 108 without the printed personal information. When the dialogue box 366 text fields have been filled the operator may either select "O.K." 352 for printing or "cancel" 356. If "O.K." 352 is selected, the software application primes the pen 172, initializes the plotter, and prints the card 108. If the operator selects "cancel" 356, the dialog box 344 is removed by the application program and the operator is returned to the original operator entry screen 336.

The terms and descriptions used herein are set forth by way of illustration only and are not meant as limitations. Those skilled in the art will recognize that numerous variations are possible within the spirit and scope of the invention as defined in the following claims.

I claim:

1. A system for electronically recording client personal information and issuing individually customized pre-manufactured plastic cards in a single interview with the card issuing authority, wherein the customized pre-manufactured plastic cards have a unique card identification affixed to each card and wherein a permanent record is made of the recorded client personal information by printing on a prepared writing surface on the customized pre-manufactured plastic card at the time of card issuance, comprising:
   data entry means for entering the unique card identification and for entering client personal information which corresponds to the unique card identification during a client interview with the card issuing authority;
   means for automatically creating an electronic client record of the unique card identification and corresponding client personal information at time of card issuance;
   means for storing the electronic client record at time of card issuance; and
   means for printing a permanent record of the client personal information at time of card issuance, comprising:
      plotting mechanism;
      communication means for communicating client personal information to the plotting mechanism;
      a means for holding the customized pre-manufactured plastic card in printing position;
      smudge resistant ink; and
      a means for delivering the ink such that the ink instantly and permanently adheres to the prepared writing surface.

2. The system of claim 1 wherein the plastic card further comprises polyvinyl chloride material.

3. A system for printing information on a plastic card during a client interview for immediate card distribution to the client, comprising:
   a plastic card including a prepared card writing surface and pre-embossed alphanumeric characters;
   a print system comprising:
      cardholder for holding the plastic card during printing;
      permanent ink; and
      means for delivering the permanent ink to a card writing surface such that it adheres to the prepared writing surface and is smudge resistant; and
   a data processing system comprising:
      means for entry of card specific data;
      means for key entry of information to be printed on the card; and
      means for driving the print system to print the information on the prepared card writing surface during a client interview.

4. A system for printing information on a plastic card during a client interview for immediate card distribution to the client, comprising:
   a plastic card including a prepared card writing surface and pre-embossed alphanumeric characters that are raised from the surface of the plastic card;
   a print system comprising:
      cardholder for holding the plastic card during printing;
      permanent ink; and
      means for delivering the permanent ink to a card writing surface such that it adheres to the prepared writing surface and is smudge resistant; and
   a data processing system comprising:
      means for entry of card specific data;
      means for key entry of information to be printed on the card; and
      means for driving the print system to print the information on the prepared card writing surface during a client interview.

5. A system for printing information on a plastic card during a client interview for immediate card distribution to the client, comprising:
   a plastic card including a prepared card writing surface and pre-embossed alphanumeric characters that are embossed using a flat graphics technique;
   a print system comprising:
      cardholder for holding the plastic card during printing;
      permanent ink; and
      means for delivering the permanent ink to a card writing surface such that it adheres to the prepared writing surface and is smudge resistant; and
   a data processing system comprising:
      means for entry of card specific data;
      means for key entry of information to be printed on the card; and
      means for driving the print system to print the information on the prepared card writing surface during a client interview.

6. A system for printing information on a plastic card during a client interview for immediate card distribution to the client, comprising:
   a plastic card including a prepared card writing surface that comprises foil material;
   a print system comprising:
      cardholder for holding the plastic card during printing;
      permanent ink; and
      means for delivering the permanent ink to a card writing surface such that it adheres to the prepared writing surface and is smudge resistant; and
   a data processing system comprising:
      means for entry of card specific data;
      means for key entry of information to be printed on the card; and
      means for driving the print system to print the information on the prepared card writing surface during a client interview.

7. A system for printing information on a plastic card during a client interview for immediate card distribution to the client, comprising:

a plastic card including a prepared card writing surface that comprises paper material;
a print system comprising:
cardholder for holding the plastic card during printing;
permanent ink; and
means for delivering the permanent ink to a card writing surface such that it adheres to the prepared writing surface and is smudge resistant; and
a data processing system comprising:
means for entry of card specific data;
means for key entry of information to be printed on the card; and
means for driving the print system to print the information on the prepared card writing surface during a client interview.

8. A system for printing information on a plastic card during a client interview for immediate card distribution to the client, comprising:
a plastic card including a prepared card writing surface that comprises a matted finish;
a print system comprising:
cardholder for holding the plastic card during printing;
permanent ink; and
means for delivering the permanent ink to a card writing surface such that it adheres to the prepared writing surface and is smudge resistant; and
a data processing system comprising:
means for entry of card specific data;
means for key entry of information to be printed on the card; and
means for driving the print system to print the information on the prepared card writing surface during a client interview.

9. A system for storing and printing personal information, wherein the information is printed during a client interview on a personal card having a prepared writing surface, comprising:
a printing system comprising:
cardholder for holding the card during printing;
permanent ink; and
means for delivering the ink to the prepared writing surface wherein the ink adheres to the prepared writing surface;
a host data processing system for storing personal information;
a personal computer system comprising:
means for entry of card specific data;
means for entry of information to be printed on card;
means for communicating instructions to the printing system to assist in printing on the prepared writing surface; and
a means for sending and receiving both data and information from the host data processing system.

10. A system for smudge resistant printing of information on a pre-manufactured personal card comprising:
a personal card comprising a prepared writing surface;
a plotter comprising:
means for the plotter to communicate with a personal computer and receive instructions from the personal computer;
a cardholder comprising:
an indentation to hold the card; and
a finger hole for assisting in removing the card from the cardholder;
a pen comprising:

a tip capable of writing on the prepared writing surface;
permanent water resistant ink capable of adhering to the prepared writing surface; and
a means for delivering the ink to the tip;
a plotter arm comprising:
a pen holder;
a first means for moving the pen in the x and y direction across the prepared writing surface; and
a second means for moving the pen in the z direction and applying downward pressure on the prepared writing surface; and
a personal computer comprising:
data entry means for entry of card specific data and for entry of information to be printed on the card; and
software means for communicating instructions to the plotter to assist in directing movement of the plotter arm.

11. The system of claim 10 wherein the plotter further comprises an adaptor which holds the pen.

12. The system of claim 11 wherein the plotter further comprises rubber gaskets for holding the pen when the pen is not in use and wherein the adaptor is specially shaped to seal the pen tip against the rubber gaskets.

13. The system of claim 10 wherein the plotter further comprises a spare pen.

14. The system of claim 10 wherein the plotter further comprises a means for moving the card.

15. The system of claim 10 wherein the card further comprises raised lettering and wherein the plotter further comprises means for moving the pen at a height above the card that is greater than the height of any of the raised lettering.

16. The system of claim 10 wherein the ink further comprises quick drying components.

17. The system of claim 10 wherein the ink further comprises components that make the ink non-beading.

18. The system of claim 10 wherein the permanent ink further comprises Glycol Ethers used as a solvent.

19. The system of claim 10 wherein the ink delivery system further comprises a capillary system.

20. The system of claim 10 wherein the pen further comprises a porous absorbent material capable of holding ink.

21. The system of claim 10 wherein the pen further comprises refillable parts.

22. The system of claim 10 wherein the pen further comprises disposable parts.

23. The system of claim 10 wherein the tip further comprises a fine tip.

24. The system of claim 10 wherein the tip further comprises a ball point tip.

25. The system of claim 10 wherein the tip further comprises a felt point tip.

26. The system of claim 10 wherein the tip further comprises extruded plastic components.

27. A method for electronically recording client personal information and issuing individually customized cards in a single client interview with the card issuing authority, where in the cards have a unique card identification and a permanent record is made of the recorded client personal information on a prepared writing surface of the card at the time of card issuance, comprising:
entering of the unique card identification;
keying of the client personal information which corresponds to the unique card identification during a client interview with the card issuing authority;
creating an electronic client record of the unique card identification and corresponding client personal information at time of card issuance;

storing the electronic client record at time of card issuance; and printing of a permanent record of the client personal information at time of card issuance, comprising:
communicating client personal information to a plotting mechanism;
holding the card in a position where the plotting mechanism may plot on the card;
delivering permanent water resistant ink to the card such that the ink instantly adheres to the card and is smudge resistant.

28. The method of claim 27 further comprising the step of affixing a prepared writing surface on the card for receiving the ink.

29. A system for printing information on a plastic card during a client interview for immediate card distribution to the client, wherein the system provides smudge resistant printing of information using a pen, the system comprising:
a plastic card including a prepared card writing surface, wherein the plastic card is a personal card;
a print system comprising:
cardholder for holding the plastic card during printing, the cardholder comprising:
an indentation to hold the card; and
a finger hole for assisting in removing the card from the cardholder;
permanent ink that is water resistant;
means for delivering the permanent ink to a card writing surface such that it adheres to the prepared writing surface and is smudge resistant, wherein the means for delivering comprises the pen, the pen comprising:
a tip capable of writing on the prepared card writing surface;
a ink holding area for holding the ink; and
a means for delivering the ink from the ink holding area to the tip; and a plotter, the plotter comprising:
means for communicating with the personal computer and receiving instructions from the personal computer; and
a plotter arm comprising:
a pen holder for holding the pen;
a first means for moving the pen in the x and y direction across the prepared card writing surface; and
a second means for moving the pen in the z direction and applying downward pressure on the prepared card writing surface; and
a data processing system that is a personal computer, the data processing system comprising:
means for entry of card specific data;
means for key entry of information to be printed on the card; and
means for driving the print system to print the information on the prepared card writing surface during a client interview, wherein the means for driving the print system further comprises software means for communicating instructions to the plotter to assist in directing movement of the plotter arm to result in the printing of information.

\* \* \* \* \*